UNITED STATES PATENT OFFICE.

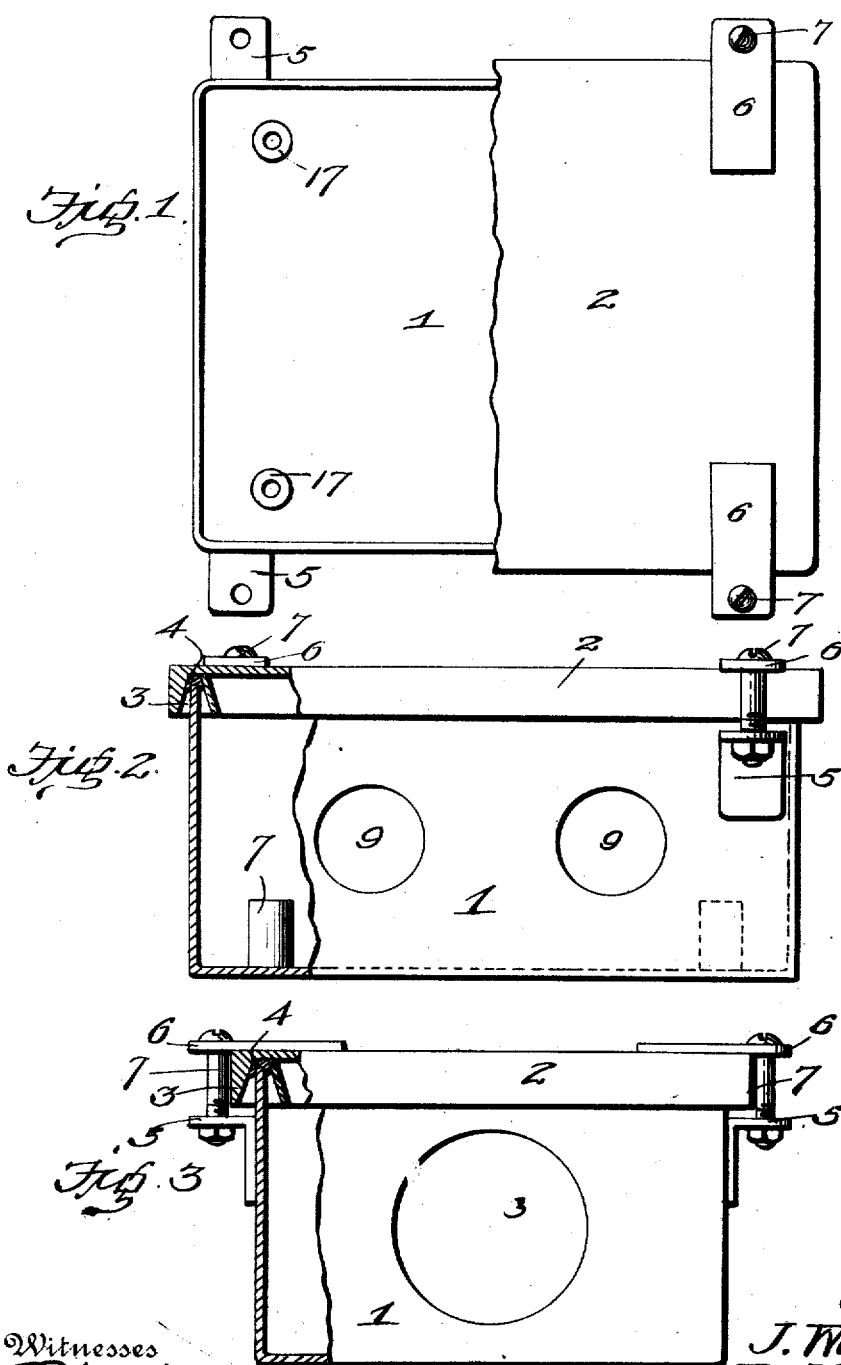

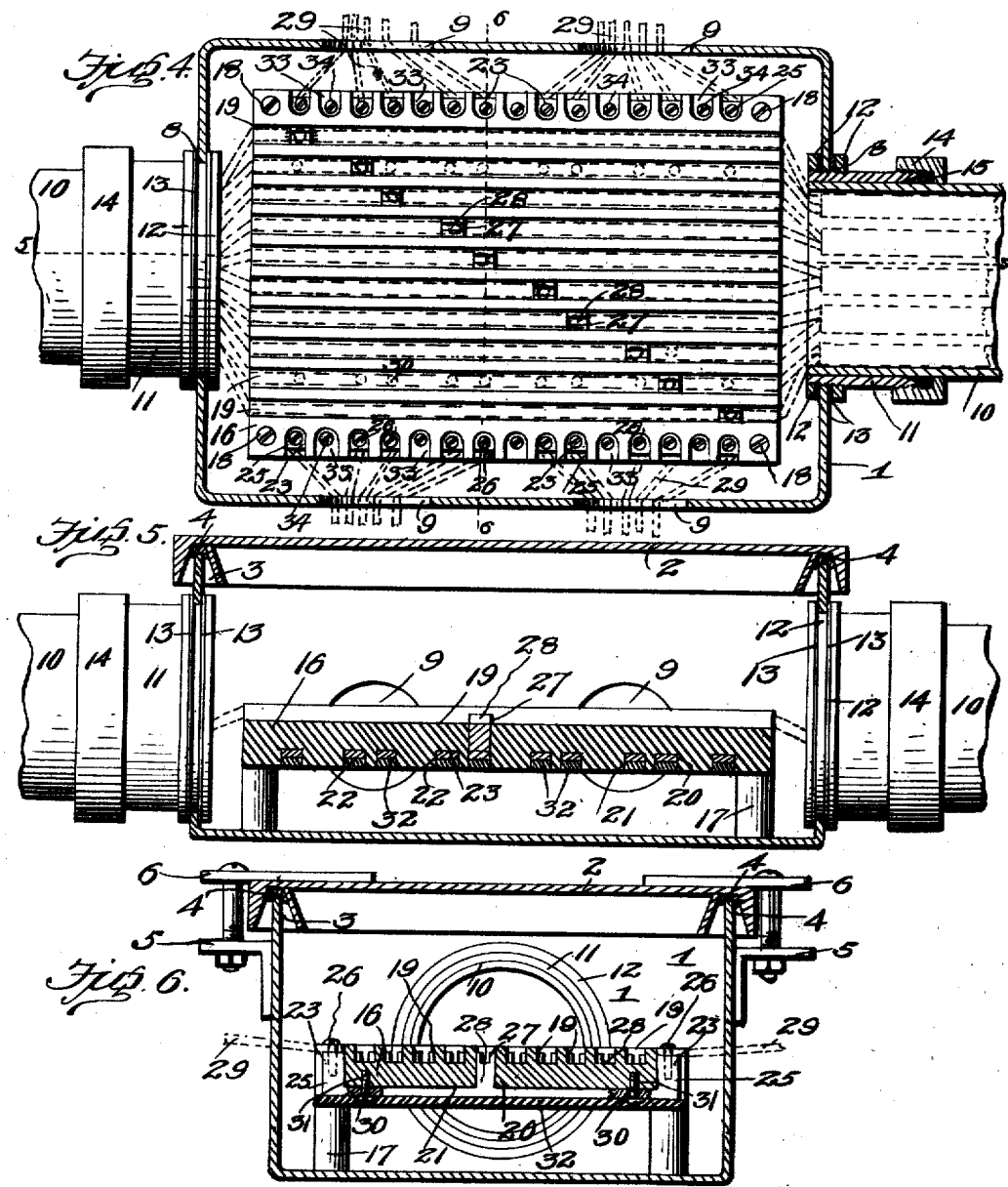

JAMES WARES AND JAMES WM. KIPPEN, OF PULLMAN STATION, ILLINOIS.

JUNCTION-BOX.

1,004,946.  Specification of Letters Patent.  Patented Oct. 3, 1911.

Application filed August 18, 1910. Serial No. 577,793.

*To all whom it may concern:*

Be it known that we, JAMES WARES and JAMES W. KIPPEN, citizens of the United States, residing at Pullman Station, in the county of Cook and State of Illinois, have invented certain new and useful Improvements in Junction-Boxes; and we do declare the following to be a full, clear, and exact description of the invention, such as will enable others skilled in the art to which it appertains to make and use the same.

This invention relates to improvements in junction boxes.

One object of the invention is to provide a box of this character having a distributing board which does away with the splicing of wire and provides a perfect electrical and mechanical connection.

Another object is to provide a junction box which will be absolutely fire and water proof and so constructed that access may be readily had to the wire connections and interior parts of the box.

With these and other objects in view, the invention consists of certain novel features of construction, combination and arrangement of parts as will be more fully described and particularly pointed out in the appended claims.

In the accompanying drawings: Figure 1 is a top plan view of the box showing the cover partly broken away; Fig. 2 is a side view of the same partly in section; Fig. 3 is an end view of the box partly in section; Fig. 4 is a horizontal sectional view through the box showing a plan view of the distributing board; Fig. 5 is a vertical longitudinal section through the box and board on the line 5—5 of Fig. 4; Fig. 6 is a vertical cross section of the same on the line 6—6 of Fig. 5; Fig. 7 is a perspective view of one of the bus bars.

Referring more particularly to the drawings, 1 denotes the box or casing which may be of any suitable size and shape and which is preferably constructed of heavy sheet metal. Adapted to be engaged with and secured to the open side of the box is a cover 2 around the edge of which is arranged a V-shaped channel 3 which is adapted to receive the upper edge of the box and in which is arranged a rubber gasket 4 or other suitable means whereby a water proof joint is formed between the cover and the box. On the opposite sides of the box adjacent each end thereof are apertured lugs 5, while on the cover 2 and in line with the lugs 5 are secured laterally projecting ears or lugs 6 which are provided with bolt holes or apertures which aline with the apertures in the lugs 5 on the box. Through the apertured lugs 5 and 6 are inserted clamping bolts 7 having on their outer ends nuts which when screwed upon the bolts and into engagement with the lugs 5 on the box will draw the cover down into tight engagement with the edge of the box thus forming a tight closure for the same.

In the ends of the box are formed openings 8 through which the main wires of the electric circuits pass into the box, while in the sides thereof at suitable positions are formed openings 9 through which the branch wires are adapted to pass. With the openings 8 in the ends of the box are connected the ends of wire conduits 10 which are here shown in the form of metal pipes. The ends of the pipes are secured in the openings 8 of the box by means of a bushing 11, which is slipped onto the ends of the pipes and is threaded on its outer side at its opposite ends as shown. One of the threaded ends of the bushing is inserted in an opening 8 of the box and on said threaded end are arranged jam nuts 12. The nuts 12 are disposed on opposite sides of the end of the box, and between the inner and outer sides of the end and the nuts are arranged packing rings or washers 13. When the nuts 12 are screwed toward each other and the washers 13 clamped into tight engagement with the end of the box a fluid tight connection is provided between the bushing and the box. On the threaded outer end of the bushing and engaged with the conduit 10 is a packing gland 14 in which is arranged a V shaped packing or gasket 15 which, when the gland is screwed up on the bushing, will bind the packing against the pipe and the inwardly inclined end of the bushing thus forming a fluid tight connection between the pipe and the outer end of the bushing.

Arranged in the box is a distributing board 16 which is preferably in the form of a porcelain block. The distributing board 16 is supported in the box upon suitable posts 17 arranged in the opposite corners thereof, said posts having formed therein threaded sockets into which are screwed the inner ends of fastening screws 18 which are inserted through apertures arranged in each corner of the board thereby securely fastening the latter in place in the box. In the upper side of the distributing board or block 16 are formed a series of longitudinally disposed wire receiving channels 19 through which the individual line wires of the circuit are passed after entering the box through the conduit 10. In the lower side of the board or block and extending transversely across the same at right angles to the channels 19 are a series of parallel channels 20 in each of which is arranged a bus bar 21. The bus bars 21 comprise a base section or strip 22 having at its outer ends upwardly projecting integrally formed binding posts 23 which are adapted to engage notches or recesses 25 formed in the opposite side edges of the distributing board. The binding posts 23 are provided with threaded sockets in which are arranged binding screws 26 whereby the branch conducting wires are connected to the bus bars. At a suitable position on each of the bus bars is an integrally formed upwardly projecting main wire connection or terminal post 27, adapted to project through an opening in the block 16 in the base of a channel 19 and in the upper end of which is formed a notch or recess 28. With the notches or recesses 28 in the post 27 are engaged the line wires which pass through the channels 19 of the distributing board. Where the line wires engage the notched upper end of the binding post the insulation is removed from the wires and the latter soldered or otherwise secured in the notched upper ends of the post to form a perfect electrical connection therewith. The branch conducting wires 29 which feed the individual circuits enter the box through the openings 9 in the sides thereof and are connected to the binding posts 23 on the opposite ends of the bus bars by the binding screws 26 arranged therein. The bars 21 are secured in the channels 20 of the distributing board by suitable fastening screws 30 which are inserted through suitable holes formed in the base strip 22 and are screwed into threaded apertures 31 formed in the board 16 of the box. The channels 20 in the lower side of the distributing board in which the bus bars are disposed are preferably of greater depth than the width of the base strips 22 of the bars so that said base strips will be countersunk or set up into the channels and adapted to be covered by a suitable insulating composition 32 arranged in the lower portions of the channels below the bars.

In the upper side of the distributing board adjacent to its opposite edges are formed a series of recesses 33, said recesses being here shown as disposed between every two of the recesses 25 in which the binding posts 23 of the bus bars are arranged. In the recessed portions 33 of the block are formed threaded sockets in which are adapted to be screwed binding screws 34 which provide neutral or dead connections to be used for switch loop service and which have no electrical connection, but are simply fastened to the board by the binding screws 34.

A junction box constructed in accordance with our invention is adapted to be used in connection with electric lighting, power, or wherever junction boxes may be employed. By means of the distributing board employed in connection with the box all splicing of the wires is dispensed with and a perfect electrical and mechanical connection is provided. It will also be noted that in forming the box in the manner described access may be readily had to the connections and interior parts of the box at all times and that an absolutely water proof construction is provided, thus preventing short circuiting or grounding of the circuits by dampness.

From the foregoing description taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described our invention, what we claim is:

1. In a junction box, the combination of a casing, a main line conduit leading from opposite sides of the casing, a distributing board within the casing having longitudinal channels in its upper side receiving the main line wires, and a series of transverse bus bars secured to the under side of the board and provided at their ends with binding posts to secure the branch line wires and at intermediate points with integral upstanding posts projecting through the board to engage the main line wires.

2. A junction box comprising a casing, a main wire conduit leading from opposite sides of the casing, a distributing board constructed of non-conducting material, said board having formed in its upper side a series of longitudinal channels adapted to receive the main line wires of an electric circuit and having formed in its lower side a series of transverse channels, a series of bus bars arranged in said transverse channels and secured to said board, upwardly projecting binding posts formed on the opposite ends of said bus bars and adapted to receive the branch conducting wires of the circuits, a series of upwardly projecting main line terminal posts formed on said bars, and means to electrically connect the main line wires to the said posts.

3. A junction box comprising a casing having formed in its ends and sides wire receiving apertures, supporting posts arranged in said casing, a main wire conduit connected to the opposite ends of the casing, a distributing board arranged in the casing and engaged with the supporting posts therein, means to secure the board to said posts, said board having formed therein a series of longitudinal channels adapted to receive the main line wires of the circuit and a series of transverse channels formed in the opposite side of the board and arranged at right angles to the main wire channels and a series of bus bars engaged with said channels, said bars having formed on their opposite ends branch wire binding posts and midway their ends, main line wire binding posts, said latter posts having notched upper ends projecting through the board and into the main line wire channels of the latter whereby said main line wires are engaged with the notched ends of said posts and are electrically connected thereto.

In testimony whereof we have hereunto set our hands in presence of two subscribing witnesses.

JAMES WARES.
JAMES WM. KIPPEN.

Witnesses:
WILLIAM H. ARMAND,
H. L. COLWARD.